(12) United States Patent
Nolte

(10) Patent No.: US 6,434,571 B1
(45) Date of Patent: Aug. 13, 2002

(54) METHOD, APPARATUS AND COMPUTER PROGRAM PRODUCT FOR IMPLEMENTING MEETING FUNCTIONS IN AN ELECTRONIC CALENDAR

(75) Inventor: Roger Reinholdt Nolte, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/324,379

(22) Filed: Jun. 2, 1999

(51) Int. Cl.[7] .......................... G06F 17/00; G06F 17/60
(52) U.S. Cl. ............................................. 707/104; 705/9
(58) Field of Search .............................. 705/9; 358/1.1; 345/329; 707/100–104; 379/73.17; 709/204, 205; 710/65–72

(56) References Cited

U.S. PATENT DOCUMENTS 5,261,045 A * 11/1993 Scully et al. ............... 345/329
5,664,063 A * 9/1997 Johnson et al. ............. 358/1.1
5,692,125 A * 11/1997 Schloss et al. ................ 705/9

* cited by examiner

*Primary Examiner*—Safet Metjahic
*Assistant Examiner*—Te Yu Chen
(74) *Attorney, Agent, or Firm*—Joan Pennington

(57) ABSTRACT

A method, apparatus and computer program product are provided for implementing meeting functions in an electronic calendar. A main meeting is scheduled. Checking for a user selected option is performed responsive to scheduling the main meeting. Responsive to an identified user selected option, a user selected meeting is scheduled with a linkage to the scheduled main meeting. The user selected option includes a pre-meeting and a post meeting. Responsive to a changed main meeting, each user selected pre-meeting and post meeting with a linkage to the scheduled main meeting is processed.

16 Claims, 5 Drawing Sheets

METHOD, APPARATUS AND COMPUTER PROGRAM PRODUCT FOR IMPLEMENTING MEETING FUNCTIONS IN AN ELECTRONIC CALENDAR

FIELD OF THE INVENTION

The present invention relates generally to the data processing field, and more particularly, relates to a method, apparatus and computer program product for implementing meeting functions in an electronic calendar.

DESCRIPTION OF THE RELATED ART

Current electronic calendars such as PROFS and Lotus Notes, permit various options to schedule a meeting such as attendees, repeating, periodic and the like. The current way that pre-meetings or post meetings are scheduled is to handle them as a separate meeting. Therefore, when meetings are changed, the scheduling user has to remember there was a pre-meeting or post meeting, and also reschedule it. Known electronic calendars do not provide for any easy mechanism to also at the same time schedule a pre-meeting or post-meeting.

Main meetings with executives or upper management often also involve pre-meetings or post meetings by the work group. A mechanism is needed to easily and efficiently implement meeting functions in an electronic calendar. A need exists for a way to easily schedule either or both a pre-meeting and a post-meeting with a main meeting.

SUMMARY OF THE INVENTION

Principal objects of the present invention are to provide a method, apparatus, and computer program product for implementing meeting functions in an electronic calendar. Other important objects of the present invention are to provide such method, apparatus and computer program product for implementing meeting functions in an electronic calendar substantially without negative effect and that overcome many of the disadvantages of prior art arrangements.

In brief, a method, apparatus and computer program product are provided for implementing meeting functions in an electronic calendar. A main meeting is scheduled. Checking for a user selected option is performed responsive to scheduling the main meeting. Responsive to an identified user selected option, a user selected meeting is scheduled with a linkage to the scheduled main meeting.

In accordance with features of the invention, the user selected option includes a pre-meeting and a post meeting. Responsive to a changed main meeting, each user selected pre-meeting and post meeting with a linkage to the scheduled main meeting is processed.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
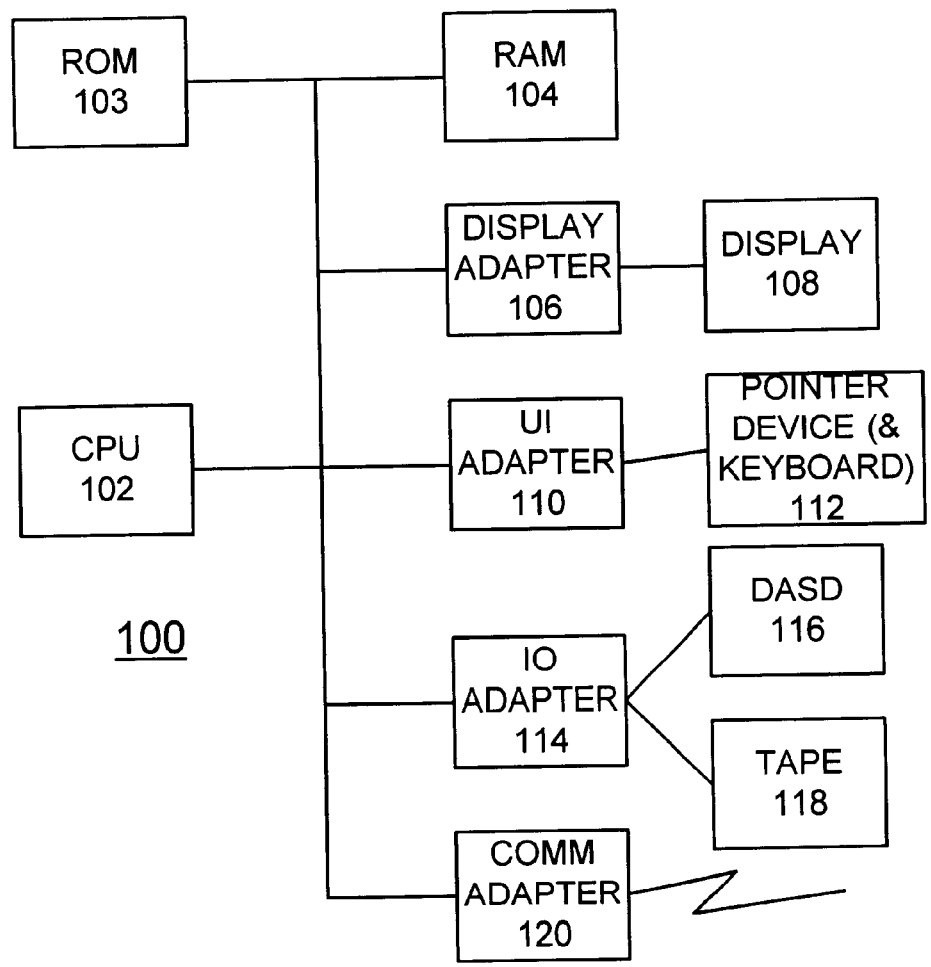
FIGS. 1A and 1B are block diagram representations illustrating a computer system and operating system for implementing a method and computer program product for implementing meeting functions in an electronic calendar in accordance with the invention.
Figure 1B:
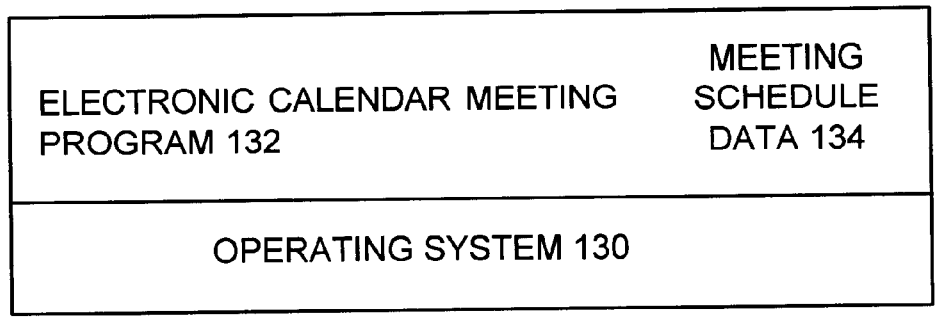

Having reference now to the drawings, in FIGS. 1A and 1B, there is shown a computer or data processing system generally designated by the reference character 100 for carrying out the meeting scheduling method of the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130 and a electronic calendar meeting program 132 of the preferred embodiment. Meeting schedule data 134 is stored for electronic calendar meeting schedules of the preferred embodiment.

Various commercially available computers can be used for computer system 100, for example, an IBM personal computer. CPU 102 is suitably programmed by the electronic calendar meeting program 132 to execute the flowcharts of FIGS. 2 and 3.

In accordance with features of the preferred embodiment, scheduling is enabled for both pre-meeting and post-meeting with each scheduled main meeting. When any main meeting is moved, the pre-meetings and post meetings also can be easily rescheduled. The method of the preferred embodiment remembers each main meeting and enables rapid rescheduling of one or multiple pre-meetings and/or post meetings. With the increased movement for individual users to schedule their own meetings, the method of the preferred embodiment becomes more important.

In accordance with features of the preferred embodiment, options are provided to define pre-meetings and post meetings that are linked to the main meeting. Attributes of these meetings include an amount of time to schedule the meeting before or after the main meeting, such as 1 day or 1 hour, and a list of required and optional attendees for the pre-meetings and post meetings. This list may be different or the same as the main meeting. An option is provided to use the same list as the main meeting. The schedule of each pre-meeting and post meeting has the same features as the main meeting, such as looking for open times, sending invitations, and the like.

An important feature of the invention is that when the main meeting is rescheduled or deleted, the links to each pre-meeting and post meeting also are processed. In the case of a deleted main meeting, the pre-meeting or post meeting optionally can also be canceled. When a main meeting is being rescheduled, then the pre-meetings and post meetings can also optionally be rescheduled in accordance with features of the preferred embodiment.

Figure 2:
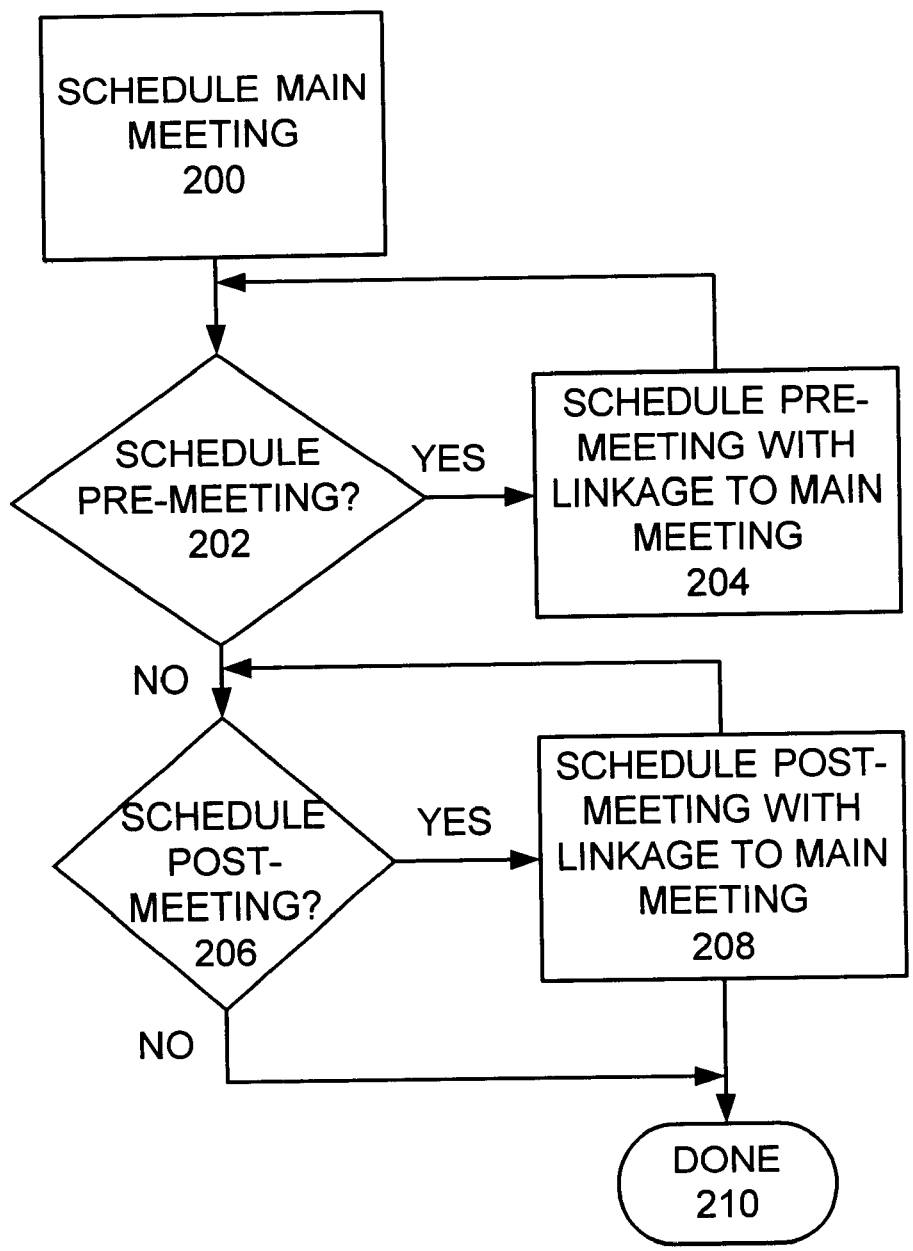
FIGS. 2 and 3 are flow charts illustrating exemplary steps for implementing meeting functions in an electronic calendar in accordance with the preferred embodiment.
Figure 3:
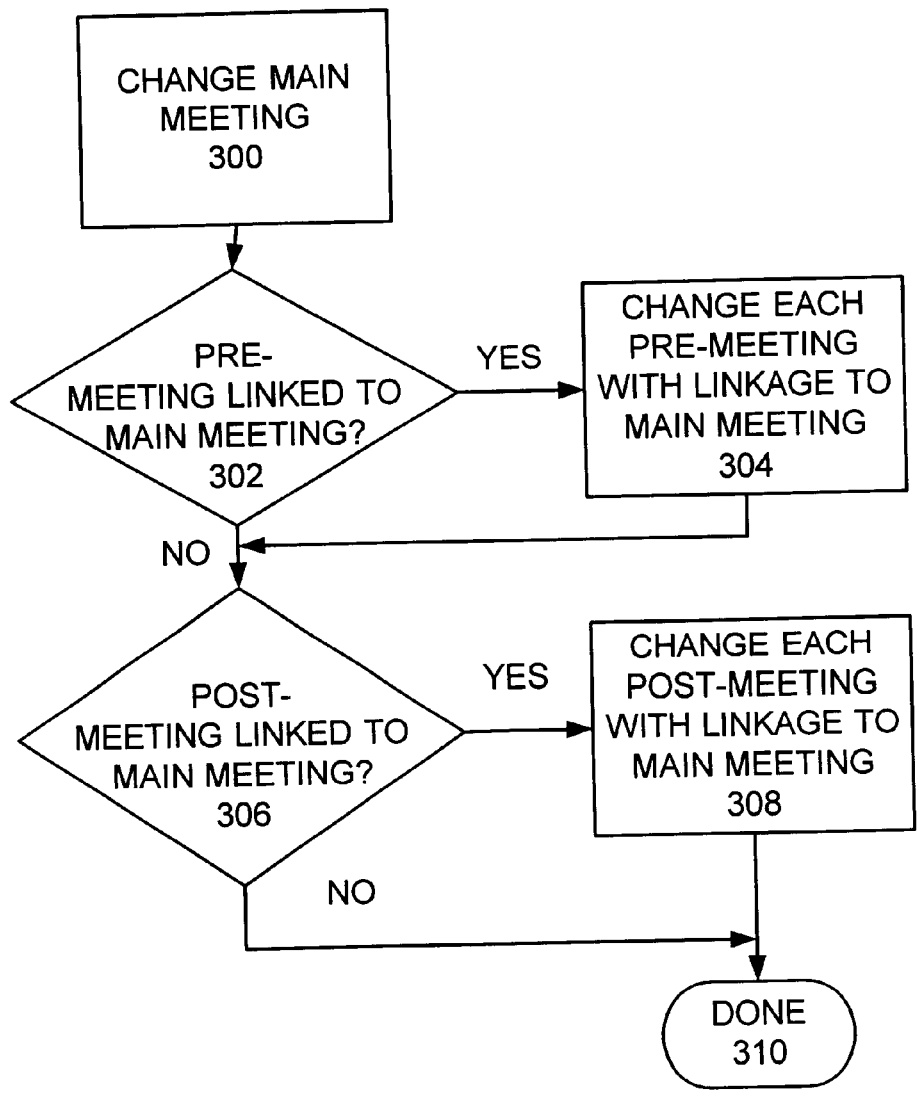

Referring to FIGS. 2 and 3, there are shown illustrative steps for implementing meeting functions in an electronic calendar in accordance with the preferred embodiment. In FIG. 2 exemplary steps for scheduling an initial main meeting are shown starting at a block 200. A user selected entry for scheduling a pre-meeting is identified as indicated at a decision block 202. As indicated at a block 204, a pre-meeting is scheduled with a linkage to the main meeting scheduled at block 200. Checking for a user selected entry for scheduling a post meeting is performed as indicated at a decision block 206. When a post meeting user selected entry is identified, a post meeting is scheduled with a linkage to the main meeting scheduled as indicated at a block 208. The illustrative steps are repeated for scheduling each desired pre-meeting and post-meeting. The sequential operations are completed as indicated at a block 210.

In FIG. 3 exemplary steps for rescheduling a main meeting are shown starting at a block 300. Checking for a pre-meeting linked to the changed main meeting automatically is performed responsive to changing the main meeting as indicated at a decision block 302. Each identified pre-meeting with a linkage to the main meeting changed at block 300 is processed and changed as indicated at a block 304. Checking for a post meeting linked to the main meeting is performed as indicated at a decision block 306. Each identified post meeting with a linkage to the main meeting changed at block 300 is changed as indicated at a block 308. This completes the sequential operations as indicated at a block 310.

Figure 4:
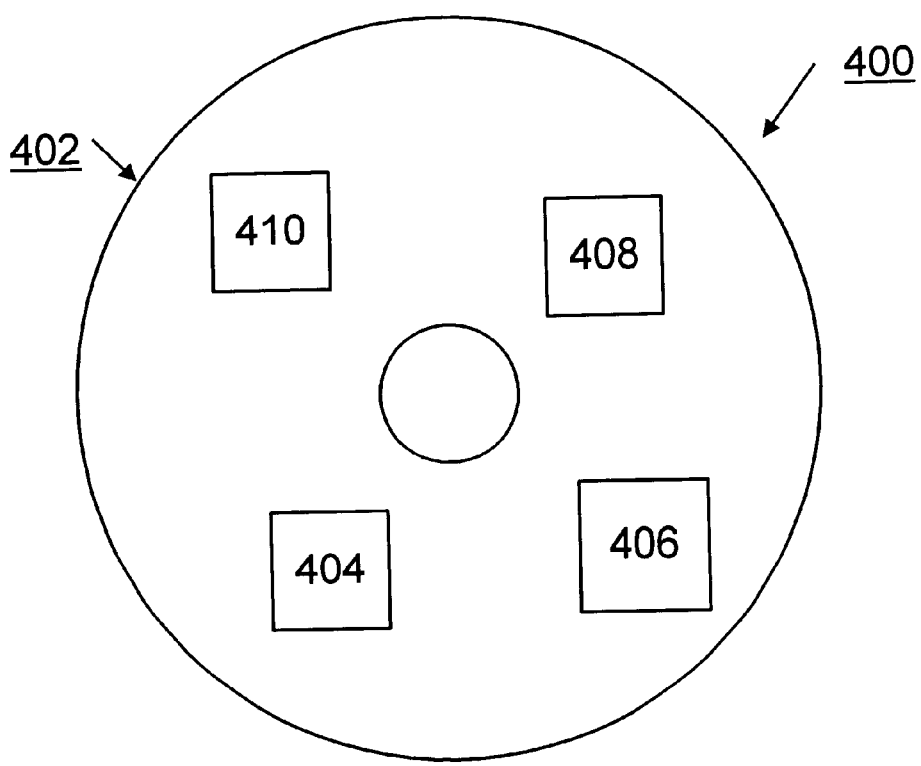
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing meeting functions in an electronic calendar of the preferred embodiment in the system 100 of FIGS. 1A and 1B.

A sequence of program instructions or a logical assembly of one or more interrelated modules defined by the recorded program means 404, 406, 408, 410, direct the computer system 100 for implementing meeting functions in an electronic calendar of the preferred embodiment.

While the present invention has been described with reference to the details of the embodiments of the invention shown in the drawing, these details are not intended to limit the scope of the invention as claimed in the appended claims.

What is claimed is:

1. A computer implemented method for implementing meeting functions in an electronic calendar comprising the steps of:

scheduling a main meeting;

responsive to scheduling said main meeting, checking a user interface for a user selected option; said user selected option including a pre-meeting and a post meeting; and responsive to an identified user selected option, scheduling a user selected meeting with a linkage to said scheduled main meeting.

2. The computer implemented method for implementing meeting functions in an electronic calendar of claim 1 wherein said steps of checking said user interface for said user selected option; said user selected option including a premeeting and a post meeting; and responsive to said user selected option, scheduling said user selected meeting with said linkage to said scheduled main meeting includes the steps of;

checking said user interface for a user post meeting selection;

responsive to an identified user post meeting selection, scheduling said identified user selected post meeting with said linkage to said scheduled main meeting.

3. The computer implemented method for implementing meeting functions in an electronic calendar of claim 1 wherein said steps of checking said user interface for said user selected option; said user selected option including said pre-meeting and said post meeting; and responsive to said user selected option, scheduling said user selected meeting with said linkage to said scheduled main meeting includes the steps of;

checking said user interface for said user premeeting selection;

responsive to an identified user premeeting selection, scheduling said identified user selected pre-meeting with said linkage to said scheduled main meeting.

4. The computer implemented method for implementing meeting functions in an electronic calendar of claim 1 includes the step of changing said scheduled main meeting.

5. The computer implemented method for implementing meeting functions in an electronic calendar of claim 4 includes the step of checking for a pre-meeting with said linkage to said scheduled main meeting responsive to said changed main meeting.

6. The computer implemented method for implementing meeting functions in an electronic calendar of claim 5 includes the step of changing said pre-meeting with said linkage to said scheduled main meeting responsive to said changed main meeting.

7. The computer implemented method for implementing meeting functions in an electronic calendar of claim 4 includes the step of checking for a post meeting with said linkage to said scheduled main meeting responsive to said changed main meeting.

8. The computer implemented method for implementing meeting functions in an electronic calendar of claim 5 includes the step of changing said post meeting with said linkage to said scheduled main meeting responsive to said changed main meeting.

9. Apparatus for implementing meeting functions in an electronic calendar comprising:

stored meeting schedule data, said meeting schedule data including a scheduled main meeting and each user selected meeting with a linkage to said scheduled main meeting;

an electronic calendar meeting program for scheduling said main meeting, responsive to scheduling said main meeting, checking a user interface for a user selected option; said user selected option including a pre-meeting and a post meeting; and responsive to an identified user selected option, scheduling said user selected meeting with said linkage to said scheduled main-meeting; and storing said meeting schedule data including said scheduled main meeting and each said user selected meeting with said linkage to said scheduled main meeting.

10. Apparatus for implementing meeting functions in an electronic calendar of claim 9 wherein said electronic calendar meeting program changes said scheduled main meeting; and utilizes said stored meeting schedule data for changing each said user selected meeting with said linkage to said scheduled main meeting responsive to said changed scheduled main meeting.

11. A computer program product for implementing meeting functions in an electronic calendar, said computer program product including a plurality of computer executable instructions stored on a computer readable medium, wherein said instructions, when executed by said computer, cause the computer to perform the steps of:

scheduling a main meeting;

responsive to said scheduled main meeting, checking a user interface for a user selected pre-meeting and a user selected post meeting; and responsive to an identified user pre-meeting, scheduling said user selected pre-meeting with a linkage to said scheduled main meeting.

12. The computer program product of claim 11 wherein said instructions, when executed by said computer, further cause the computer to perform the steps of:

responsive to an identified user post meeting, scheduling said user selected post meeting with said linkage to said scheduled main meeting.

13. The computer program product of claim 11 wherein said instructions, when executed by said computer, further cause the computer to perform the steps of:

changing said scheduled main meeting; and responsive to said changed scheduled main meeting, checking for said linkage for said user selected pre-meeting.

14. The computer program product of claim 13 wherein said instructions, when executed by said computer, further cause the computer to perform the steps of:

responsive to identifying said linkage for said user selected pre-meeting, changing said user selected pre-meeting.

15. The computer program product of claim 12 wherein said instructions, when executed by said computer, further cause the computer to perform the steps of:

changing said scheduled main meeting; and responsive to said changed scheduled main meeting, checking said user interface for said linkage for said user selected post meeting.

16. The computer program product of claim 13 wherein said instructions, when executed by said computer, further cause the computer to perform the steps of:

responsive to identifying said linkage for said user selected post meeting, changing said user selected post meeting.

* * * * *